(12) United States Patent
Takagi et al.

(10) Patent No.: US 10,861,647 B2
(45) Date of Patent: Dec. 8, 2020

(54) METHOD FOR MANUFACTURING MONOLITHIC CERAMIC ELECTRONIC COMPONENT

(71) Applicant: Murata Manufacturing Co., Ltd., Nagaokakyo (JP)

(72) Inventors: Yuya Takagi, Nagaokakyo (JP); Akira Fujita, Nagaokakyo (JP); Hideaki Tanaka, Nagaokakyo (JP); Togo Matsui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 293 days.

(21) Appl. No.: 15/902,188

(22) Filed: Feb. 22, 2018

(65) Prior Publication Data

US 2018/0240593 A1 Aug. 23, 2018

(30) Foreign Application Priority Data

Feb. 23, 2017 (JP) .................................. 2017-032111

(51) Int. Cl.
*H01G 4/012* (2006.01)
*H01G 4/30* (2006.01)
*H01G 4/224* (2006.01)
*H01G 4/12* (2006.01)
(Continued)

(52) U.S. Cl.
CPC ............... *H01G 4/012* (2013.01); *H01G 4/12* (2013.01); *H01G 4/224* (2013.01); *H01G 4/30* (2013.01);
(Continued)

(58) Field of Classification Search
CPC ......... B28B 1/48; C04B 35/00; C04B 35/632; C04B 35/638; H01B 1/22; H01G 4/12;
(Continued)

(56) References Cited

U.S. PATENT DOCUMENTS

2012/0233828 A1 9/2012 Matsui et al.
2012/0234462 A1 9/2012 Matsui et al.

FOREIGN PATENT DOCUMENTS

CN 102683020 A 9/2012
JP 64-000289 A 1/1989
(Continued)

OTHER PUBLICATIONS

Official Communication issued in Chinese Patent Application No. 201810153828.9, dated Jun. 3, 2019.
(Continued)

*Primary Examiner* — Carl J Arbes
(74) *Attorney, Agent, or Firm* — Keating & Bennett, LLP

(57) ABSTRACT

A method for manufacturing a monolithic ceramic electronic component includes preparing a mother block including ceramic green sheets stacked on each other, and an internal electrode pattern arranged along interfaces between the ceramic green sheets, cutting the mother block along first and second cutting lines that are perpendicular or substantially perpendicular to each other to obtain green chips each having a laminated structure including ceramic layers and internal electrodes in a raw state, the internal electrodes being exposed on a cut side surface produced by cutting along the first cutting line, forming a raw ceramic protective layer on the cut side surface to obtain a raw component body, and firing the raw component body, wherein the cut side surface is treated with a degreasing agent.

20 Claims, 8 Drawing Sheets

(51) Int. Cl.
    *H01G 4/248*     (2006.01)
    *H01G 4/232*     (2006.01)

(52) U.S. Cl.
    CPC ......... *H01G 4/1227* (2013.01); *H01G 4/1236* (2013.01); *H01G 4/232* (2013.01); *H01G 4/248* (2013.01)

(58) Field of Classification Search
    CPC .... H01G 4/012; H01G 4/1227; H01G 4/1236; H01G 4/224; H01G 4/232; H01G 4/248; H01G 4/30; H05K 3/46; H05K 3/4605
    See application file for complete search history.

(56) References Cited

FOREIGN PATENT DOCUMENTS

| JP | 03-124011 A | 5/1991 |
|---|---|---|
| JP | 04-84408 A | 3/1992 |
| JP | 2001003081 A * | 1/2001 |
| JP | 2005-327929 A | 11/2005 |
| JP | 2010087521 A * | 4/2010 |
| JP | 2012-004236 A | 1/2012 |
| JP | 4883902 B2 * | 2/2012 |
| JP | 2012-209539 A | 10/2012 |
| JP | 2013-110239 A | 6/2013 |
| JP | 5567842 B2 * | 8/2014 |
| JP | 5678905 B2 | 3/2015 |

OTHER PUBLICATIONS

Official Communication issued in corresponding Korean Patent Application No. 10-2018-0012872, dated Apr. 29, 2019.
English translation of Official Communication issued in corresponding Japanese Patent Application No. 2017-032111, dated Sep. 29, 2020.

* cited by examiner

METHOD FOR MANUFACTURING
MONOLITHIC CERAMIC ELECTRONIC
COMPONENT

CROSS REFERENCE TO RELATED APPLICATIONS

This application claims the benefit of priority to Japanese Patent Application No. 2017-032111 filed on Feb. 23, 2017. The entire contents of this application are hereby incorporated herein by reference.

BACKGROUND OF THE INVENTION

1. Field of the Invention

The present invention relates to a method for manufacturing a monolithic ceramic electronic component.

2. Description of the Related Art

Monolithic ceramic electronic components include, as one example, monolithic ceramic capacitors. Monolithic ceramic capacitors are manufactured by, for example, stacking ceramic green sheets each including an internal electrode formed thereon to obtain a raw component body, firing the raw component body, and forming external electrodes on opposing end surfaces of the sintered component body. Thus, a monolithic ceramic capacitor is obtained in which the internal electrodes led out to both end surfaces are electrically connected to the respective external electrodes.

Recently, a demand for smaller monolithic ceramic capacitors having higher capacitances has been increasing along with a decrease in size and an increase in functionality of electronic components. To provide smaller monolithic ceramic capacitors having higher capacitances, it is effective to increase the effective area of the internal electrodes occupying the ceramic green sheets, that is, the opposing area of the internal electrodes.

For example, JP 5678905 B discloses a method for manufacturing a monolithic ceramic electronic component, the method including preparing a mother block including multiple ceramic green sheets stacked on each other and an internal electrode pattern arranged along each interface between the ceramic green sheets; cutting the mother block along a first cutting line and a second cutting line that are perpendicular to each other so as to obtain multiple green chips each having a laminated structure formed with multiple ceramic layers and multiple internal electrodes in a raw state in which the internal electrodes are exposed on a cut side surface produced by cutting along the first cutting line; applying a ceramic paste to the cut side surface to form a raw ceramic protective layer thereon so as to obtain raw component bodies; and firing the raw component bodies.

In the method disclosed in JP 5678905 B, the mother block is cut to expose the internal electrodes on the side surface so as to increase the area of the opposing internal electrodes. Meanwhile, the mother block is cut by a method such as dicing, and it causes sagging of the internal electrode due to stress from the cutting. A shorter distance between the internal electrodes leads to easier occurrence of portions in which the internal electrodes are in contact with each other over the space between the layers (hereinafter such portions are also referred to as "short-circuited portions") on the cut side surface. Chip components produced in such a state have a higher short circuit failure rate at a stage after degreasing. Thus, methods for manufacturing monolithic ceramic capacitors having higher capacitances are associated with concerns regarding the occurrence of short-circuited portions on the cut side surfaces and a high short circuit failure rate.

These concerns relate not only to manufacturing of monolithic ceramic capacitors but also to manufacturing of monolithic ceramic electronic components other than the monolithic ceramic capacitors.

SUMMARY OF THE INVENTION

Preferred embodiments of the present invention provide methods for manufacturing monolithic ceramic electronic components having reduced occurrences of short-circuited portions on a cut side surface and having a low short circuit failure rate.

A method for manufacturing a monolithic ceramic electronic component according to a preferred embodiment of the present invention includes the preparing a mother block including a plurality of ceramic green sheets stacked on each other, and an internal electrode pattern arranged along each of a plurality of interfaces between the ceramic green sheets; cutting the mother block along a first cutting line and a second cutting line that are perpendicular or substantially perpendicular to each other to obtain a plurality of green chips, the green chips each having a laminated structure including a plurality of ceramic layers and a plurality of internal electrodes in a raw state, the internal electrodes being exposed on a cut side surface produced by cutting along the first cutting line; forming a raw ceramic protective layer on the cut side surface to obtain a raw component body; and firing the raw component body, wherein the cut side surface is treated with a degreasing agent.

According to this preferred embodiment of the present invention, the cut side surface of each green chip on which the internal electrodes is exposed is treated with a degreasing agent, so that sagging of the internal electrodes that occurred from cutting is able to be removed. Thus, the occurrence of short-circuited portions on the cut side surface is reduced or prevented, resulting in a lower short circuit failure rate. This is presumably because a resin component in the conductive paste for forming the internal electrodes is emulsified and/or degreased due to the action of the degreasing agent with the result that a sagging portion of the internal electrodes falls off from the cut side surface. A resin component in the ceramic green sheets for forming ceramic layers may also be emulsified and/or degreased due to the action of the degreasing agent. Yet, usually, the resin component content in the conductive paste is smaller than in the ceramic green sheets. Thus, metallic components defining the internal electrodes are considered to fall off preferentially, based on the assumption that the resin components in the ceramic green sheets and the conductive paste are emulsified and/or degreased to a similar extent.

A method for manufacturing a monolithic ceramic electronic component according to a preferred embodiment of the present invention includes preparing a mother block including a plurality of ceramic green sheets stacked on each other, and an internal electrode pattern arranged along each of a plurality of interfaces between the ceramic green sheets; cutting the mother block along a first cutting line to obtain a plurality of rod-shaped green blocks, the green blocks each having a laminated structure including a plurality of ceramic layers and a plurality of internal electrodes in a raw state, the internal electrodes being exposed on a cut side surface produced by cutting along the first cutting line; forming a raw ceramic protective layer on the cut side surface; cutting the rod-shaped green blocks having the raw ceramic protective layer formed thereon along a second cutting line perpendicular or substantially perpendicular to the first cutting line to obtain a plurality of raw component bodies; and firing the raw component bodies, wherein the cut side surface is treated with a degreasing agent.

According to this preferred embodiment of the present invention, the cut side surface of each rod-shaped green block on which the internal electrodes are exposed is treated with a degreasing agent, so that sagging of the internal electrodes that occurred from cutting is able to be removed. Thus, the occurrence of short-circuited portions on the cut side surface is reduced, resulting in a lower short circuit failure rate.

Hereinafter, when no distinction is made between preferred embodiments of the present invention, both methods are simply referred to as a "method for manufacturing a monolithic ceramic electronic component of the present invention".

In a method for manufacturing a monolithic ceramic electronic component according to a preferred embodiment of the present invention, preferably, the mother block is cut by dicing to obtain the plurality of green chips or the plurality of rod-shaped green blocks, and a cutting fluid for the dicing includes the degreasing agent.

When the cutting fluid for dicing includes the degreasing agent, a separate step of treating the cut side surface with the degreasing agent is unnecessary, thus enabling efficient manufacturing of monolithic ceramic electronic components having a low short circuit failure rate.

Preferably, a method for manufacturing a monolithic ceramic electronic component according to a preferred embodiment of the present invention further includes a step of performing a grinding process with abrasive grains or a cutting process with a cutting bite on the cut side surface before forming the raw ceramic protective layer thereon, wherein a grinding fluid for the grinding process or a cutting fluid for the cutting process includes the degreasing agent.

The grinding process or cutting process on the cut side surface is able to remove sagging of the internal electrodes that occurred from cutting. At this time, it is possible to further remove sagging of the internal electrodes by adding the degreasing agent to the grinding fluid for the grinding process or the cutting fluid for the cutting process. In addition, when the grinding fluid for grinding process or the cutting fluid for the cutting process includes the degreasing agent, a separate step of treating the cut side surface with the degreasing agent is unnecessary, thus enabling efficient manufacturing of monolithic ceramic electronic components having a low short circuit failure rate.

A method for manufacturing a monolithic ceramic electronic component according to a preferred embodiment of the present invention may further include, after the grinding process or the cutting process, a step of ultrasonically cleaning the cut side surface before forming the raw ceramic protective layer thereon, wherein a cleaning solution for the ultrasonic cleaning preferably includes the degreasing agent.

It is possible to further eliminate sagging of the internal electrodes that occurred from cutting by ultrasonically cleaning the cut side surface with a cleaning solution including the degreasing agent after the grinding process or cutting process.

Preferably, a method for manufacturing a monolithic ceramic electronic component according to a preferred embodiment of the present invention further includes, after cutting the mother block, a step of ultrasonically cleaning the cut side surface before forming the raw ceramic protective layer thereon, wherein a cleaning solution for the ultrasonic cleaning includes the degreasing agent.

It is possible to remove sagging of the internal electrodes that occurred from cutting by ultrasonically cleaning the cut side surface with a cleaning solution including the degreasing agent after cutting the mother block.

In a method for manufacturing a monolithic ceramic electronic component according to a preferred embodiment of the present invention, the degreasing agent preferably includes a condensed phosphate. The condensed phosphate is preferably a pyrophosphate, and more preferably potassium pyrophosphate.

Condensed phosphates, such as potassium pyrophosphate, act to emulsify and/or degrease the resin component in the conductive paste for forming the internal electrodes. Thus, it is possible to remove sagging of the internal electrodes that occurred from cutting.

In a method for manufacturing a monolithic ceramic electronic component according to a preferred embodiment of the present invention, the degreasing agent preferably includes a polyalkylene glycol alkyl ether whose alkyl group has 1 to 12 carbon atoms. The polyalkylene glycol alkyl ether is preferably polyethylene glycol alkyl ether, and more preferably polyethylene glycol lauryl ether.

Polyalkylene glycol alkyl ethers, such as polyethylene glycol lauryl ether, act to emulsify and/or degrease the resin component in the conductive paste for forming the internal electrodes. Thus, it is possible to remove sagging of the internal electrodes that occurred from cutting.

In a method for manufacturing a monolithic ceramic electronic component according to a preferred embodiment of the present invention, the temperature of liquid including the degreasing agent is preferably about 10° C. or higher and about 70° C. or lower.

The higher the temperature of the liquid including the degreasing agent, the more easily the resin component in the conductive paste for forming the internal electrodes is able to be emulsified and/or degreased. Thus, sagging of the internal electrodes that occurred from cutting is able to be easily removed by setting the temperature of the liquid including the degreasing agent at about 10° C. or higher and about 70° C. or lower.

Preferred embodiments of the present invention provide methods for manufacturing monolithic ceramic electronic components having reduced occurrence of short-circuited portions on a cut side surface and having a low short circuit failure rate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of methods for manufacturing a monolithic ceramic electronic component according to the present invention are described.

The present invention is not limited to the following preferred embodiments, and may be suitably modified without departing from the gist of the present invention. Combinations of two or more preferred features described in the following preferred embodiments are also within the scope of the present invention.

The present invention will now be described referring to a method for manufacturing a monolithic ceramic capacitor as an example of a preferred embodiment of a method for manufacturing a monolithic ceramic capacitor according to the present invention. Manufacturing methods according to preferred embodiments of the present invention are applicable to different monolithic ceramic electronic components other than the monolithic ceramic capacitor.

First, a monolithic ceramic capacitor that is obtained by a method for manufacturing a monolithic ceramic electronic component according to a preferred embodiment of the present invention is described.

Figure 1:
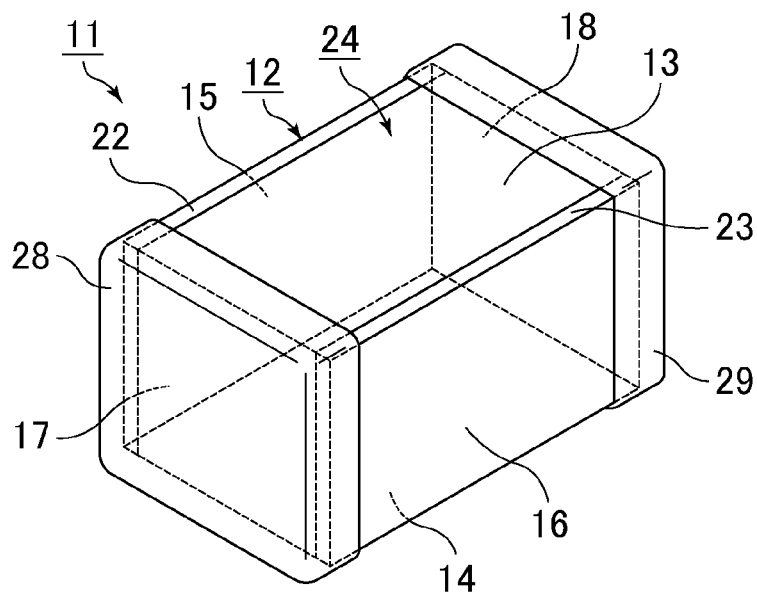
FIG. 1 is a perspective view schematically illustrating an example of a monolithic ceramic capacitor obtained by a method for manufacturing a monolithic ceramic electronic component according to a preferred embodiment of the present invention.
Figure 2:
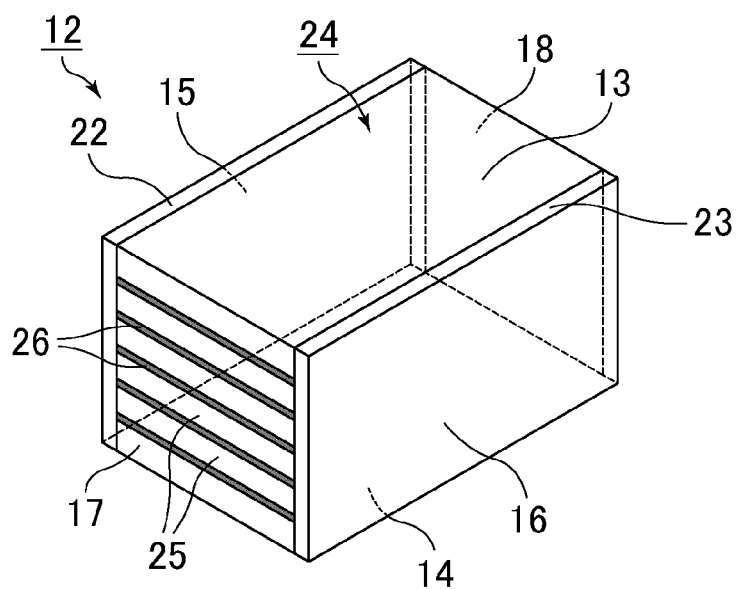
FIG. 2 is a perspective view schematically illustrating an example of a component body that defines the monolithic ceramic capacitor illustrated in FIG. 1.

FIG. 1 is a perspective view schematically illustrating an example of a monolithic ceramic capacitor obtained by the method for manufacturing a monolithic ceramic electronic component according to the present preferred embodiment of the present invention. FIG. 2 is a perspective view schematically illustrating an example of a component body of the monolithic ceramic capacitor illustrated in FIG. 1.

A monolithic ceramic capacitor 11 illustrated in FIG. 1 includes a component body 12. As illustrated in FIG. 2, the component body 12 preferably has a rectangular parallelepiped or substantially rectangular parallelepiped shape, and includes a pair of opposing main surfaces 13 and 14, a pair of opposing side surfaces 15 and 16, and a pair of opposing end surfaces 17 and 18.

Figure 3:
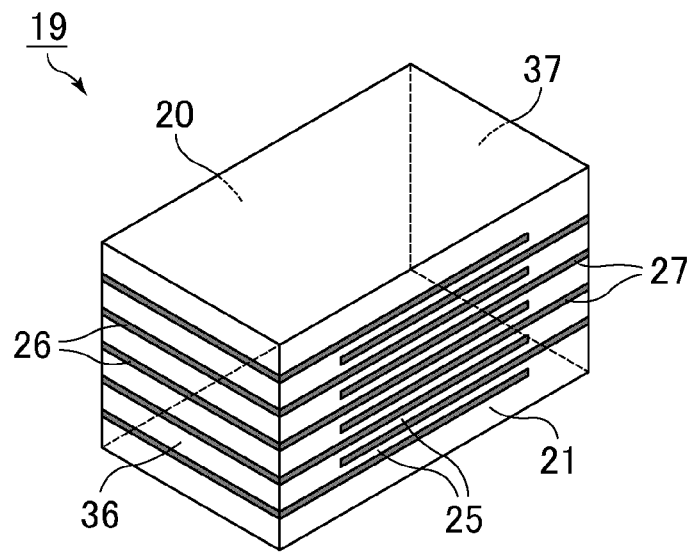
FIG. 3 is a perspective view schematically illustrating an example of a green chip, prepared to produce the component body illustrated in FIG. 2.

FIG. 3 is a perspective view schematically illustrating an example of a green chip, prepared to produce the component body illustrated in FIG. 2.

As described later, the component body 12 illustrated in FIG. 2 is obtained by firing a green chip 19 illustrated in FIG. 3 including raw ceramic protective layers 22 and 23 formed on a pair of opposing side surfaces (hereinafter referred to as "cut side surfaces") 20 and 21, respectively. In the following description, a portion of the fired component body 12, which is derived from the green chip 19, is referred to as a laminate section 24.

As illustrated in FIGS. 2 and 3, the laminate section 24 in the component body 12 has a laminated structure including a plurality of ceramic layers 25 extending in the direction of the main surfaces 13 and 14 and stacked in the direction perpendicular or substantially perpendicular to the main surfaces 13 and 14, and a plurality of pairs of internal electrodes 26 and 27 each provided along the interface between the ceramic layers 25. The component body 12 includes the pair of ceramic protective layers 22 and 23 located on the cut side surfaces 20 and 21 of the laminate section 24, respectively, so as to provide the component body 12 with the side surfaces 15 and 16. The ceramic protective layers 22 and 23 preferably have the same or substantially the same thickness.

While in FIGS. 1 and 2, the boundary between the laminate section 24 and each of the ceramic protective layers 22 and 23 is depicted clearly for the convenience of description, such a boundary may not be so clear.

As illustrated in FIGS. 2 and 3, the internal electrodes 26 and 27 oppose each other with the ceramic layer 25 therebetween. The opposing arrangement of the internal electrodes 26 and 27 provides electrical characteristics. In other words, a capacitance is generated in the monolithic ceramic capacitor 11 illustrated in FIG. 1.

Each internal electrode 26 includes an exposed end that is exposed on the end surface 17 of the component body 12, and each internal electrode 27 includes an exposed end that is exposed on the end surface 18 of the component body 12. Further, since the ceramic protective layers 22 and 23 described above are located on the side surfaces 15 and 16 of the component body 12, the internal electrodes 26 and 27 are not exposed on these side surfaces.

As illustrated in FIG. 1, the monolithic ceramic capacitor 11 further includes external electrodes 28 and 29. The external electrodes 28 and 29 are arranged on at least the pair of end surfaces 17 and 18 of the component body 12, respectively, so as to be electrically connected to the respective exposed ends of the internal electrodes 26 and 27.

The external electrodes 28 and 29 are provided on at least the pair of end surfaces 17 and 18 of the component body 12, respectively. In FIG. 1, the external electrodes 28 and 29 extend onto portions of the main surfaces 13 and 14 and portions of the side surfaces 15 and 16.

A conductive material of the internal electrodes may preferably be a metallic material, such as Ni, Cu, Ag, Pd, Ag—Pd alloy, or Au, for example.

A ceramic material of the ceramic layers and the ceramic protective layers may preferably be a dielectric ceramic primarily containing $BaTiO_3$, $CaTiO_3$, $SrTiO_3$, or $CaZrO_3$, for example.

Preferably, at least the main component of the ceramic material of the ceramic protective layers is the same as that of the ceramic material of the ceramic layers. In this case, it is particularly preferred that a ceramic material of the same composition is used for both of the ceramic layers and the ceramic protective layers.

As described above, the manufacturing method according to the present preferred embodiment is also applicable to monolithic ceramic electronic components other than monolithic ceramic capacitors. For example, in the case in which the monolithic ceramic electronic component is a piezoelectric component, a piezoelectric ceramic, such as a PZT ceramic, is preferably used, and in the case in which the monolithic ceramic electronic component is a thermistor, a semiconductor ceramic such as a spinel ceramic is preferably used.

The external electrodes preferably include an underlayer and a plating layer formed on the underlayer. Examples of conductive materials of the underlayer include Cu, Ni, Ag, Pd, Ag—Pd alloy, and Au. The underlayer may be formed either by a co-firing method that applies a conductive paste to the raw component body and firing the conductive paste simultaneously with the component body, or by a post-firing method that applies and fires a conductive paste to the fired component body. Alternatively, the underlayer may be formed directly by plating, or may be formed by curing conductive resin including thermosetting resin.

Preferably, the plating layer formed on the underlayer has a two-layer structure including, for example, Ni-plating and Sn-plating thereon.

Next, the method for manufacturing a monolithic ceramic electronic component according to the present preferred embodiment is described.

In the method for manufacturing a monolithic ceramic electronic component according to the present preferred embodiment, the cut side surface is treated with a degreasing agent. Sagging of the internal electrodes that occurred on the cut side surface is able to be removed by treating the cut side surface on which the internal electrodes are exposed with the degreasing agent.

Hereinafter, a method for manufacturing the monolithic ceramic capacitor 11 illustrated in FIG. 1 is described as an example of a preferred embodiment of the present invention.

The following preferred embodiments are provided as examples, and features of different preferred embodiments can be partially exchanged or combined with each other. In the second preferred embodiment and subsequent preferred embodiments, descriptions of matters common to the first preferred embodiment are omitted, and only different points are described. In particular, similar effects by similar features are not mentioned in each preferred embodiment.

First Preferred Embodiment

First, a ceramic green sheet that turns into a ceramic layer is prepared. The ceramic green sheet is formed on a carrier film using a coater such as a die coater, a gravure coater, or a micro gravure coater, for example.

In addition to the ceramic material including the above dielectric ceramic, the ceramic green sheet also includes a resin component, such as a binder, an antistatic agent, and other suitable additives, for example. Examples of the resin component in the ceramic green sheets include a cellulose resin, an acrylic resin, a polyvinyl alcohol resin, a polyvinyl butyral resin, a phthalate resin, a fatty acid ester resin, and glycol derivatives.

The ceramic green sheets each preferably have a thickness of about 3 μm or less, preferably about 1 μm or less, more preferably about 0.6 μm or less, for example.

Next, a conductive paste is printed in a predetermined pattern on the ceramic green sheets. The conductive paste is applied to the ceramic green sheets by a method, such as screen printing, ink-jet printing, or gravure printing, for example.

In addition to the metallic material, the conductive paste also includes a co-material, a resin component such as a binder, and a solvent, for example. Examples of the co-material include the ceramic material used in the ceramic layers. Examples of the resin component in the conductive paste include a cellulose resin, an acrylic resin, a polyvinyl alcohol resin, a polyvinyl butyral resin, a phthalate resin, a fatty acid ester resin, and glycol derivatives. The resin component in the conductive paste may be the same as or different from the resin component in the ceramic green sheet.

Figure 4:
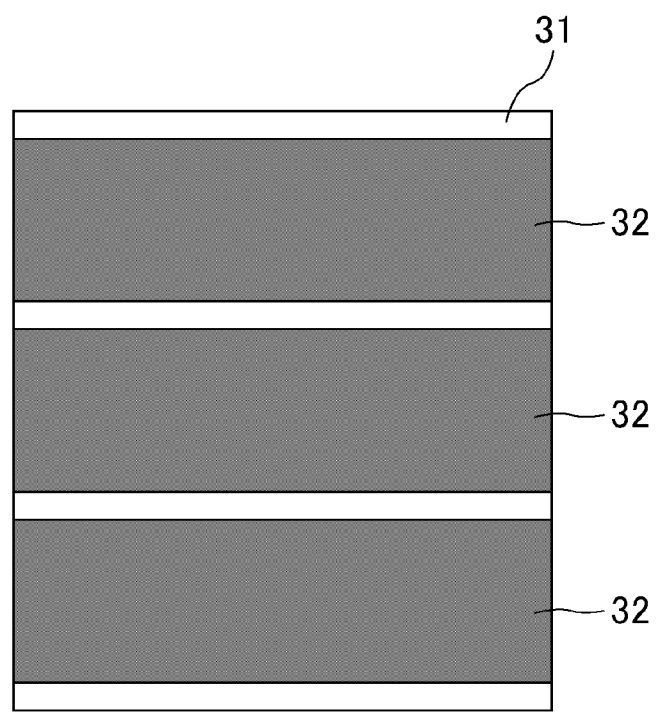
FIG. 4 is a plan view schematically illustrating an example of one of ceramic green sheets each including internal electrode patterns formed thereon, prepared to produce the green chip illustrated in FIG. 3.

FIG. 4 is a plan view schematically illustrating an example of one of the ceramic green sheets each including internal electrode patterns formed thereon, prepared to produce the green chip illustrated in FIG. 3.

As illustrated in FIG. 4, a conductive paste is printed into a predetermined pattern on each ceramic green sheet 31 that turns into the ceramic layer 25, such that internal electrode patterns 32 that turn into the internal electrodes 26 and 27 are formed. Specifically, multiple rows of the strip-shaped internal electrode patterns 32 are formed on each ceramic green sheet 31.

The thickness of the internal electrode patterns is not particularly limited, but is preferably about 1.5 μm or less, for example.

Subsequently, a stacking step is performed in which a predetermined number of the ceramic green sheets with the internal electrode patterns formed thereon are stacked with a shift to produce a stack, and a predetermined number of ceramic green sheets without the internal electrode patterns are stacked on top and bottom of the stack.

Figure 5A:
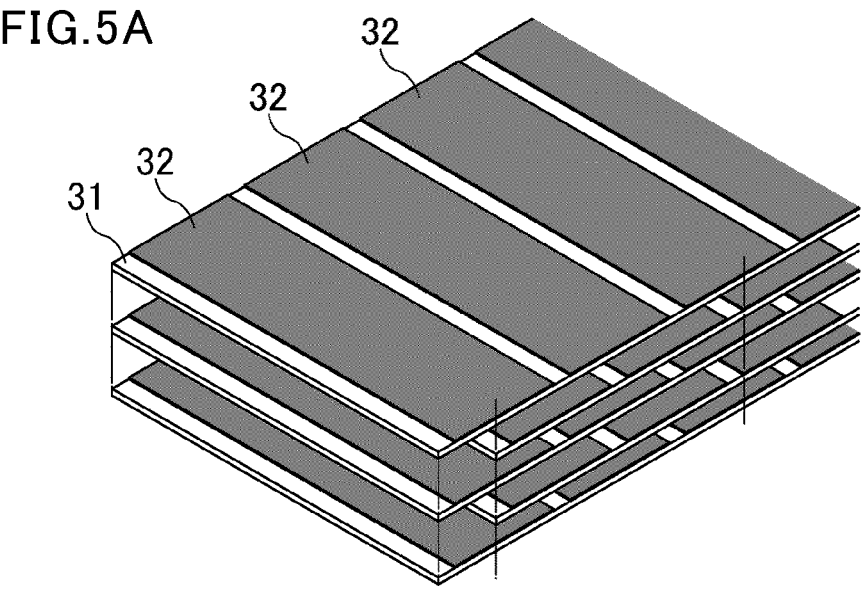
FIG. 5A is a perspective view for describing a step of stacking the ceramic green sheets illustrated in FIG. 4 in a method for manufacturing a monolithic ceramic electronic component according to a preferred embodiment of the present invention.

FIG. 5A is a perspective view for describing the step of stacking the ceramic green sheets illustrated in FIG. 4.

As illustrated in FIG. 5A, a predetermined number of the ceramic green sheets 31 each including the internal electrode patterns 32 formed thereon are stacked with a shift of a predetermined distance, i.e., half the widthwise dimension of the internal electrode patterns 32, in the width direction to produce a stack. Further, a predetermined number of ceramic green sheets on which no internal electrode pattern is printed are stacked on top and bottom of the stack.

Figure 5B:
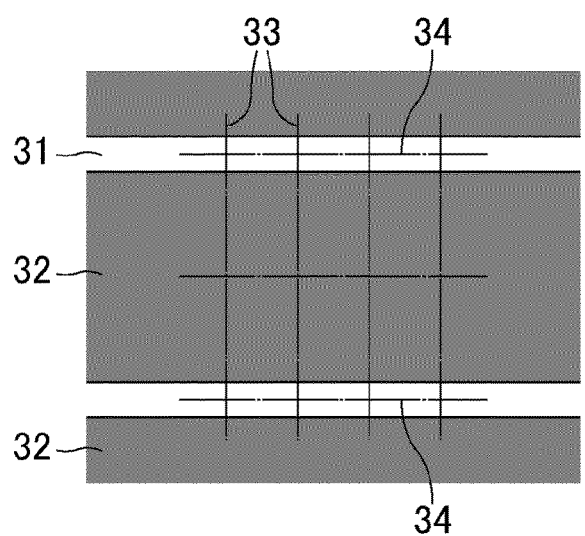
FIGS. 5B and 5C are plan views for describing the step of stacking the ceramic green sheets illustrated in FIG. 4.
Figure 5C:
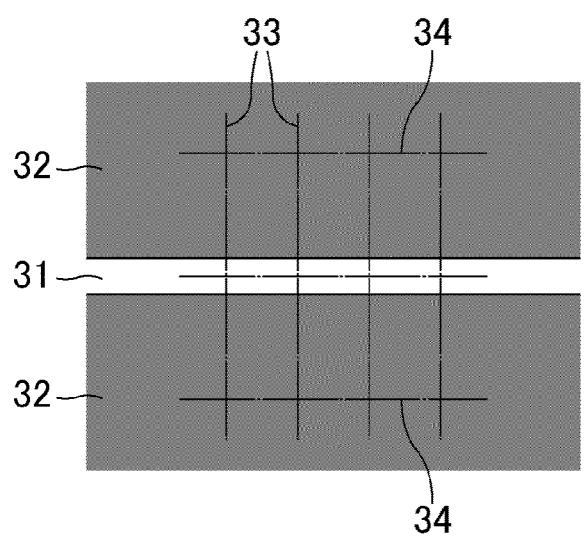

FIGS. 5B and 5C are plan views for describing the step of stacking the ceramic green sheets illustrated in FIG. 4. FIGS. 5B and 5C illustrate expanded views of a first ceramic green sheet and a second ceramic green sheet, respectively.

FIGS. 5B and 5C illustrate portions of first cutting lines 33 in the first direction (the vertical direction in FIGS. 5B and 5C) perpendicular or substantially perpendicular to the extending direction of the strip-shaped internal electrode patterns 32, and portions of second cutting lines 34 in the second direction (the horizontal direction in FIGS. 5B and 5C) perpendicular or substantially perpendicular to the first cutting lines. Each strip-shaped internal electrode pattern 32 has a shape such that the two internal electrodes 26 and 27 coupled to each other through their lead portions are arranged contiguously in the second direction. The same cutting lines 33 and 34 are illustrated in FIGS. 5B and 5C.

As a result of the stacking step, a mother block is obtained which includes the plurality of ceramic green sheets stacked on each other, and the internal electrode pattern arranged along each of a plurality of interfaces between the ceramic green sheets. The mother block obtained is pressed in the stacking direction by a method such as isostatic pressing, for example.

The pressed mother block is cut along each first cutting line and each second cutting line perpendicular or substantially perpendicular to each other, such that a plurality of green chips are obtained.

In the first preferred embodiment, the mother block is preferably cut by dicing, wherein a cutting fluid for the dicing includes a degreasing agent.

Figure 6:
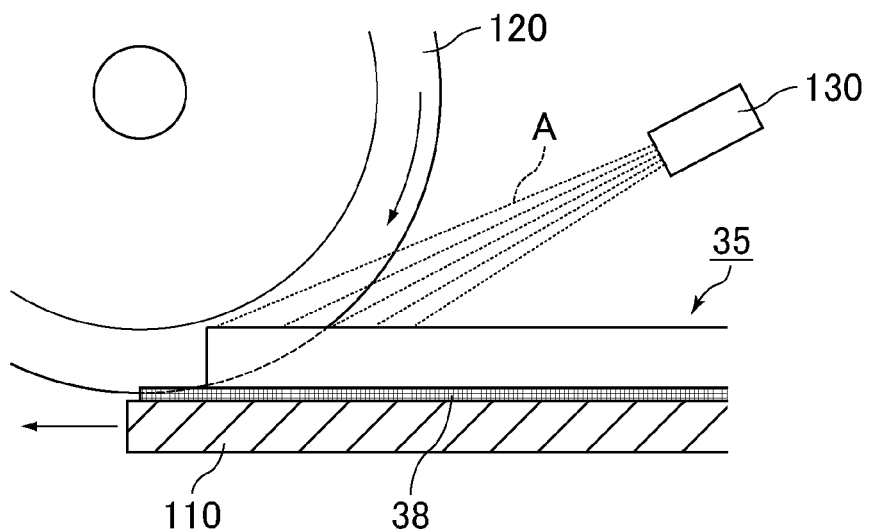
FIG. 6 is a schematic view illustrating an example of a method for cutting a mother block by dicing in a method for manufacturing a monolithic ceramic electronic component according to a preferred embodiment of the present invention.

FIG. 6 is a schematic view illustrating an example of a method for cutting the mother block by dicing.

As illustrated in FIG. 6, a mother block 35 is located on a table 110, and the table 110 is moved below a dicing blade 120 rotating at a high speed, so that the dicing blade 120 comes into contact with the mother block 35, such that the mother block 35 is cut. As illustrated in FIG. 6, preferably, the mother block 35 is adhesively held by an adhesive sheet 38 and located together with the adhesive sheet 38 on the table 110.

When cutting, as illustrated in FIG. 6, a cutting fluid A is sprayed from a nozzle 130 to a portion to be processed on the mother block 35. The cutting fluid A cools the dicing blade 120 and the mother block 35, and washes away cutting chips resulting from cutting, at the same time. Further, since the cutting fluid A includes the degreasing agent, sagging of the internal electrodes that occurred on the cut side surface is removed.

The degreasing agent in the cutting fluid may be of any type as long as it is able to emulsify and/or degrease the resin component in the conductive paste. For example, the degreasing agent may preferably include, for example, a condensed phosphate or a polyalkylene glycol alkyl ether whose alkyl group has 1 to 12 carbon atoms. These may be used alone or in combination of two or more thereof.

Examples of the condensed phosphate include pyrophosphates such as potassium pyrophosphate and sodium pyrophosphate, and polyphosphates such as potassium polyphosphate and sodium polyphosphate. These may be used alone or in a combination of two or more thereof. Of these, pyrophosphates are preferred, and potassium pyrophosphate is more preferred.

For the polyalkylene glycol alkyl ether whose alkyl group has 1 to 12 carbon atoms, the carbon number of the alkylene group is not particularly limited, but is preferably 2, for example. In other words, the polyalkylene glycol alkyl ether is preferably polyethylene glycol alkyl ether, for example. The carbon number of the alkylene group of the polyalkylene glycol alkyl ether may be 3 or 4, for example.

The carbon number of the alkyl group of the polyalkylene glycol alkyl ether is preferably 8 or greater, and more preferably 12 or greater, for example.

In the case in which the polyalkylene glycol alkyl ether is polyethylene glycol alkyl ether, examples thereof include polyethylene glycol octyl ether, polyethylene glycol nonyl ether, polyethylene glycol decyl ether, polyethylene glycol ether, polyethylene glycol lauryl ether, polyethylene glycol cetyl ether, polyethylene glycol stearyl ether, and polyethylene glycol oleyl ether. These may be used alone or in a combination of two or more thereof. Of these, polyethylene glycol lauryl ether is preferred.

The temperature of the cutting fluid including the degreasing agent is not particularly limited, but is preferably about 10° C. or higher and about 70° C. or lower, and more preferably about 20° C. or higher and about 40° C. or lower, for example, in view of removing sagging of the internal electrodes.

The concentration of the degreasing agent in the cutting fluid is not particularly limited, but is preferably about 0.1% by weight or more and about 50% by weight or less, for example, in view of removing sagging of the internal electrodes.

Figure 7:
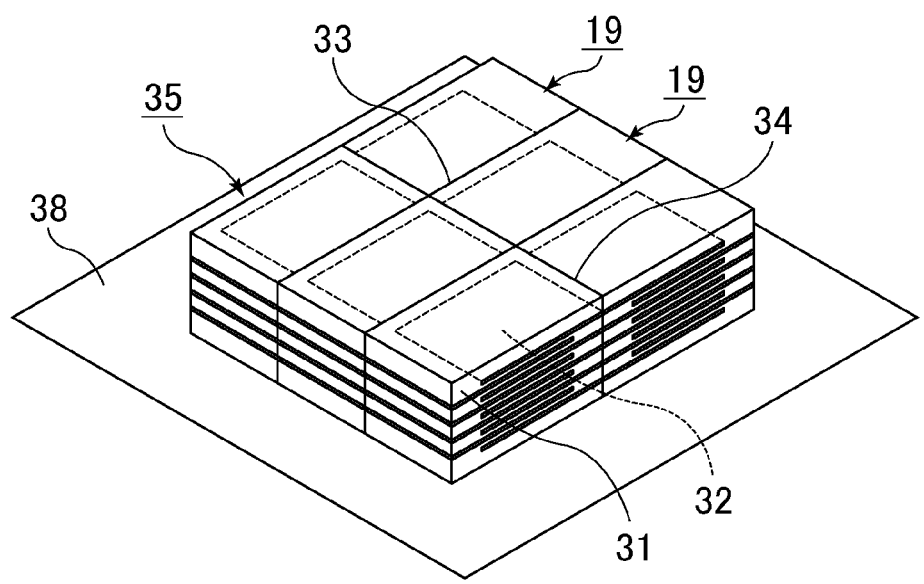
FIG. 7 is a perspective view for describing a step of cutting a mother block in a method for manufacturing a monolithic ceramic electronic component according to a preferred embodiment of the present invention.

FIG. 7 is a perspective view for describing a step of cutting a mother block.

In FIG. 7, the mother block 35 is cut along the first cutting lines 33 and the second cutting line 34 that are perpendicular or substantially perpendicular to each other, such that the multiple green chips 19 arranged in the row and column directions are obtained. In FIG. 7, the uppermost internal electrode pattern 32 inside the mother block 35 is indicated by broken lines. In FIG. 7, six green chips 19 are obtained from a single mother block 35, but in actuality, more green chips 19 are obtained.

As illustrated in FIG. 3, each green chip 19 has a laminated structure including a plurality of ceramic layers 25 and a plurality of internal electrodes 26 and 27 in a raw state. The cut side surfaces 20 and 21 of each green chip 19 are surfaces produced by cutting along the first cutting lines 33, and the cut end surfaces 36 and 37 are surfaces produced by cutting along the second cutting lines 34. All of the internal electrodes 26 and 27 are exposed on the cut side surfaces 20 and 21. In contrast, only the internal electrodes 26 are exposed on the cut end surface 36, and only the internal electrodes 27 are exposed on the other cut end surface 37.

As illustrated in FIG. 7, preferably, the mother block is cut while being affixed to the adhesive sheet 38 having expandability so that the multiple green chips 19 will be arranged in the row and column directions. In this case, the adhesive sheet 38 may be expanded by an expander (not shown).

Figure 8:
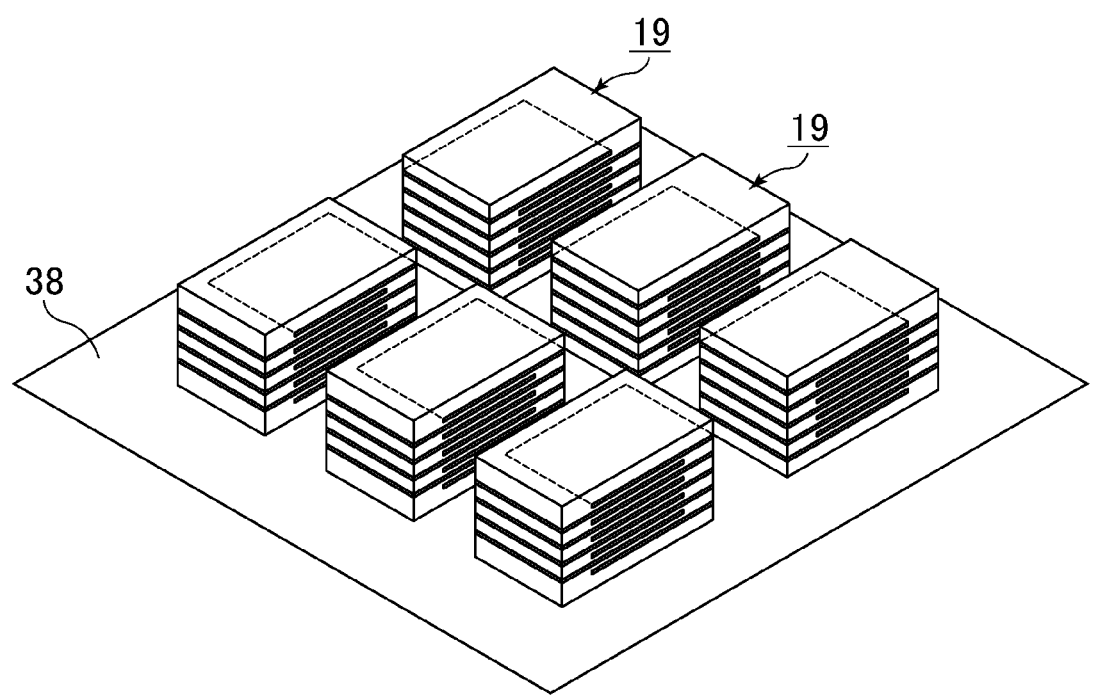
FIG. 8 is a perspective view illustrating a state in which the multiple green chips arranged in the row and column directions are spaced apart from each other.

FIG. 8 is a perspective view illustrating a state in which the multiple green chips arranged in the row and column directions are spaced apart from each other.

Preferably, as illustrated in FIG. 8, the multiple green chips 19 arranged in the row and column directions are spaced apart from each other by expanding the adhesive sheet 38 illustrated in FIG. 7.

Subsequently, a tumbling step is preferably performed in which the multiple green chips are tumbled so as to make the cut side surface of each of the green chips uniformly an open surface.

Figure 9A:
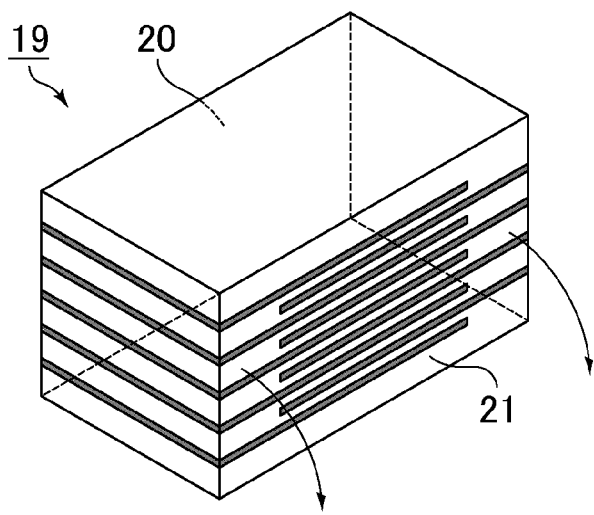
FIGS. 9A and 9B are perspective views for describing a step of tumbling the green chips in a method for manufacturing a monolithic ceramic electronic component according to a preferred embodiment of the present invention.
Figure 9B:
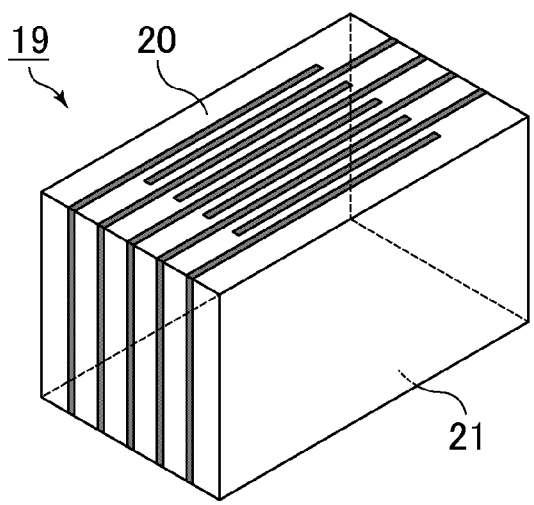

FIGS. 9A and 9B are perspective views for describing the step of tumbling the green chips.

The green chip 19 illustrated in FIG. 9A is rotated 90 degrees, such that the cut side surface 20 is able to be made an open surface facing upward as illustrated in FIG. 9B Subsequently, a raw ceramic protective layer is formed on the cut side surface. The raw ceramic protective layer is formed by, for example, attaching a green sheet for ceramic protective layers or applying a paste for ceramic protective layers.

Figure 10:
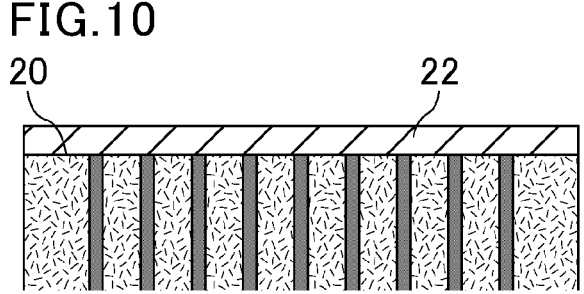
FIG. 10 is a view for describing a step of forming a raw ceramic protective layer in a method for manufacturing a monolithic ceramic electronic component according to a preferred embodiment of the present invention.

FIG. 10 is a view for describing a step of forming the raw ceramic protective layer.

As illustrated in FIG. 10, the raw ceramic protective layer 22 may be formed by attaching a green sheet for ceramic protective layers or applying a paste for ceramic protective layers to the cut side surface 20.

Preferably, the green sheet for the ceramic protective layers or the paste for the ceramic protective layers primarily includes the same ceramic material as that of the ceramic green sheet for manufacturing the mother block.

In addition, preferably, the green sheet for the ceramic protective layers or the paste for the ceramic protective layers is substantially free of Mg.

In a conventionally known method, a raw ceramic protective layer is formed using a Mg-containing green sheet for the ceramic protective layers or a Mg-containing paste for the ceramic protective layers, so that different phases are formed at an end portion of each internal electrode to reduce the short circuit failure rate. In contrast, in the method for manufacturing a monolithic ceramic electronic component according to the present preferred embodiment, the short circuit failure rate is reduced or prevented even if the green sheet for ceramic protective layers or the paste for ceramic protective layers is substantially free of Mg.

After forming the raw ceramic protective layer, a drying step is performed as necessary. In the drying step, the green chips 19 including the raw ceramic protective layer 22 formed thereon are put in an oven set at about 120° C. for about five minutes, for example.

Next, the same tumbling step as described above with reference to FIGS. 9A and 9B is preferably performed. Specifically, preferably, the tumbling step is performed in which the multiple green chips are tumbled so as to make the cut side surface of each of the green chips uniformly an open surface. In this case, each green chip is rotated 180 degrees, such that the opposite cut side surface is made an open surface facing upward.

As is described above, the raw ceramic protective layer may also be formed on the opposite cut side surface. In addition, after forming the raw ceramic protective layer, the drying step is performed as necessary. A raw component body is thus obtained.

The raw component body obtained is then fired. The firing temperature is preferably, for example, in the range of about 900° C. to about 1300° C., although it depends on the ceramic material or the metallic material in the raw component body.

A conductive paste is applied and fired to the end surfaces 17 and 18 of the fired component body, and plating is further applied as necessary, such that the external electrodes 28 and 29 are formed. The conductive paste may be applied to the raw component body, and in such a case, the conductive paste may be fired simultaneously with firing of the raw component body.

The monolithic ceramic capacitor 11 illustrated in FIG. 1 is thus obtained.

Second Preferred Embodiment

A second preferred embodiment of the present invention describes a case in which, unlike the first preferred embodiment, a grinding process with abrasive grains or a cutting process with a cutting bite (cutting tool) is performed on a cut side surface, and a grinding fluid for the grinding process or a cutting fluid for the cutting process includes a degreasing agent.

First, according to the method described in the first preferred embodiment, a mother block is produced which includes a plurality of ceramic green sheets stacked on each other and an internal electrode pattern arranged along each interface between the ceramic green sheets. The mother block obtained is pressed in the stacking direction by a method such as isostatic pressing, for example.

The pressed mother block is cut along a first cutting line and a second cutting line that are perpendicular or substantially perpendicular to each other, such that multiple green chips are obtained. A method such as dicing, force-cutting, or laser cutting, for example, is suitably used for the cutting.

When cutting the mother block by dicing, the same dicing method as described in the first preferred embodiment may be used. In this case, the type of the degreasing agent in the cutting fluid for the dicing may be the same as or different from the type of the degreasing agent in a grinding fluid for a grinding process or in a cutting fluid for a cutting process described later.

As is the case with the first preferred embodiment, as illustrated in FIG. 7, the mother block 35 is cut along the first cutting lines 33 and the second cutting line 34 that are perpendicular or substantially perpendicular to each other, such that the plurality of green chips 19 arranged in the row and column directions are obtained. At this time, preferably, the mother block 35 is cut while being affixed to the adhesive sheet 38 having expandability so that the multiple green chips 19 will be arranged in the row and column directions.

In addition, preferably, as illustrated in FIG. 8, the multiple green chips 19 arranged in the row and column directions are spaced apart from each other by expanding the adhesive sheet illustrated in FIG. 7. Subsequently, a tumbling step is preferably performed in which the multiple green chips are tumbled so as to make the cut side surface of each of the green chips uniformly an open surface.

In the second preferred embodiment, a grinding process with abrasive grains or a cutting process with a cutting bite is performed on the cut side surface, wherein a grinding fluid for the grinding process or a cutting fluid for the cutting process preferably includes the degreasing agent.

Examples of the grinding process include grinding processes with fixed abrasive grains (e.g., dicing and grinding), polishing processes with fixed abrasive grains (e.g., dry polishing and tape polishing), and polishing processes with loose abrasive grains (e.g., lapping and polishing). These processes may be used in combination. The grinding process by dicing may preferably be completed by dicing the mother block twice. The first dicing is referred to as "cutting process" and the second dicing is referred to as "grinding process" to distinguish therebetween. In this case, the average particle size of abrasive grains for the second dicing is preferably smaller than the average particle size of abrasive grains for the first dicing.

In view of preventing the occurrence of short-circuited portions, the polishing process with fixed abrasive grains or the polishing process with loose abrasive grains is preferred. In view of additionally smoothing the surface of the cut side surface, the polishing process with loose abrasive grains is more preferred. The polishing process with fixed abrasive grains is preferably tape polishing, for example. The polishing process with loose abrasive grains is preferably polishing, for example. In this case, the cut side surface may be subjected to polishing only, or may be subjected to lapping as a preprocess and then polishing. The size of abrasive grains is preferably different between lapping and polishing, and the polishing process with larger abrasive grains than those used in polishing is referred to as lapping.

In the grinding process with abrasive grains, the material of the abrasive grains is not particularly limited, but diamond abrasive grains are preferred. Diamond abrasive grains are able to be easily cleaned away and only slightly affect the firing atmosphere. Thus, an excessive grain growth during firing is reduced or prevented, making it possible to manufacture monolithic ceramic electronic components having an appropriate quality.

Figure 11:
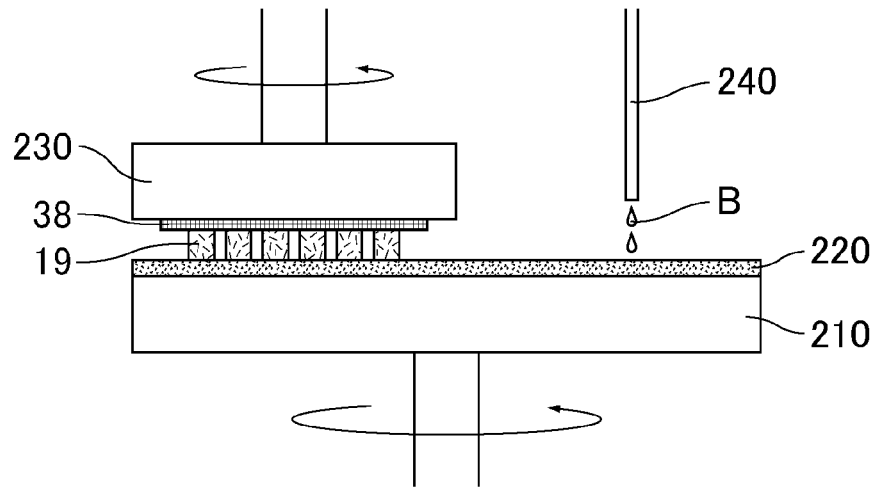
FIG. 11 is a schematic view illustrating an example of a method for performing a polishing process on cut side surfaces by polishing in a method for manufacturing a monolithic ceramic electronic component according to a preferred embodiment of the present invention.

FIG. 11 is a schematic view illustrating an example of a method for performing the polishing process on the cut side surfaces by polishing.

As illustrated in FIG. 11, the green chips 19 held by a polishing head 230 are pushed onto a polishing pad 220, and the polishing head 230 and a polishing surface plate 210 are rotated relative to each other while a polishing fluid (grinding fluid) B is dropped from a supply pipe 240, such that the cut side surface is polished. Since the polishing fluid B for the polishing process includes the degreasing agent, sagging of the internal electrodes that occurred on the cut side surface is removed. As illustrated in FIG. 11, preferably, the cut side surfaces of the multiple green chips 19 are polished while being affixed to the adhesive sheet 38.

Examples of the cutting process include a cutting process by rotation of a cutting bite, a cutting process by rotation of the green chips, a cutting process by linear movement of a cutting bite, and a cutting process by linear movement of the green chips. These processes may be used in combination.

In view of preventing the occurrence of short-circuited portions, the cutting process by rotation of a cutting bite, the cutting process by rotation of the green chips, and a cutting process combining these processes are preferred. Specifically, a cutting process with a cutting device such as a surface planer is preferred. In the case of using a surface planer, the surface of the green chips may be cut by feeding the green chips to the surface planer while a cutting bite fixed to a predetermined cut height is rotated. Further, since the surface of the green chips can be scraped away with blade edge of the cutting bite by a single operation, the surface of the green chips is also able to be made smooth.

In the cutting process with a cutting bite, the material of the cutting bite is not particularly limited, but a diamond bite is preferred.

The grinding or cutting process may be performed at any stage after cutting the mother block, as long as it is performed before forming a raw ceramic protective layer. For example, the grinding or cutting process may be performed on the cut side surface before the tumbling step, or the grinding or cutting process may be performed on the cut side surface produced by cutting without performing the tumbling step.

When the tumbling step is performed, the grinding or cutting process is preferably performed on the cut side surface turned upward by the tumbling step. The grinding process and the cutting process may be combined together. In such a case, the order of the grinding process and the cutting process is not specified.

The degreasing agent in the grinding fluid or cutting fluid may be of any suitable type. Examples thereof include those described in the first preferred embodiment.

The temperature of the grinding fluid or cutting fluid including the degreasing agent is not particularly limited, but is preferably about 10° C. or higher and about 70° C. or lower, and more preferably about 20° C. or higher and about 40° C. or lower, for example, in view of removing sagging of the internal electrodes.

The concentration of the degreasing agent in the grinding fluid or cutting fluid is not particularly limited, but is preferably about 0.1% by weight or more and about 50% by weight or less, for example, in view of removing sagging of the internal electrodes.

Figure 12A:
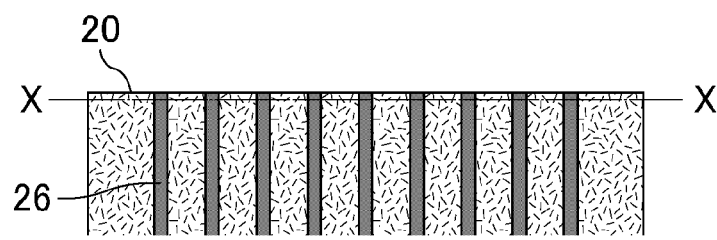
FIGS. 12A and 12B are views for describing a step of performing a grinding or cutting process in a method for manufacturing a monolithic ceramic electronic component according to a preferred embodiment of the present invention.
Figure 12B:
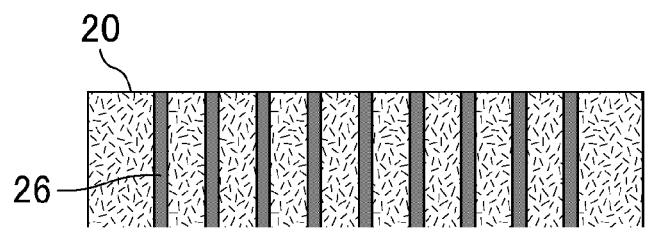

FIGS. 12A and 12B are views for describing a step of performing the grinding or cutting process. FIGS. 12A and 12B are enlarged views each illustrating the cut side surface seen from the direction of one end surface of the green chip.

As illustrated in FIGS. 12A and 12B, the grinding or cutting process is performed on the cut side surface 20 to a grinding line X-X.

In the second preferred embodiment, ultrasonic cleaning may be performed on the cut side surface after the grinding or cutting process. In this case, a cleaning solution for ultrasonic cleaning preferably includes the degreasing agent.

Ultrasonic cleaning may be performed by a known method. For example, the multiple green chips may be washed using an ultrasonic cleaning machine in which the multiple green chips held by a holder are immersed in a cleaning solution and washed with the cleaning solution being vibrated by an ultrasonic vibrator provided in a washing tank. At this time, the holder is preferably oscillated in the direction parallel or substantially parallel to the direction of vibration waves moving in the cleaning solution. This provides a higher washing effect.

Figure 13:
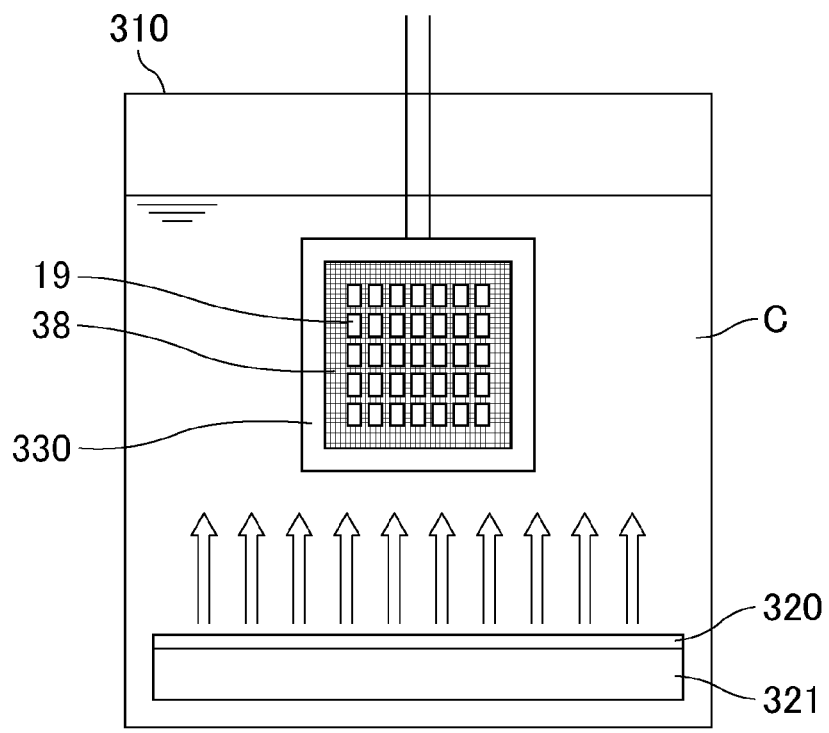
FIG. 13 is a schematic view illustrating an example of a method for ultrasonically cleaning cut side surfaces in a method for manufacturing a monolithic ceramic electronic component according to a preferred embodiment of the present invention.

FIG. 13 is a schematic view illustrating an example of a method for ultrasonically cleaning the cut side surfaces.

As illustrated in FIG. 13, the green chips 19 are held by a holder 330 and immersed in a cleaning solution C. The cut side surfaces are ultrasonically cleaned with the cleaning solution C being vibrated by a vibration plate 320 and an ultrasonic vibrator 321 assembled therewith provided in a washing tank 310. Since the cleaning solution C for ultrasonic cleaning includes the degreasing agent, sagging of the internal electrodes that occurred on the cut side surface is removed. As illustrated in FIG. 13, preferably, the cut side surfaces of the green chips 19 are ultrasonically cleaned while being affixed to the adhesive sheet 38.

The degreasing agent in the cleaning solution may be of any suitable type. Examples thereof include those described in the first preferred embodiment. The type of the degreasing agent in the cleaning solution for ultrasonic cleaning may be the same as or different from the type of the degreasing agent in the grinding fluid for the grinding process or in the cutting fluid for the cutting process.

The temperature of the cleaning solution including the degreasing agent is not particularly limited, but is preferably about 10° C. or higher and about 70° C. or lower, and more preferably about 20° C. or higher and about 40° C. or lower, for example, in view of removing sagging of the internal electrodes.

The concentration of the degreasing agent in the cleaning solution is not particularly limited, but is preferably about 0.1% by weight or more and about 50% by weight or less, for example, in view of removing sagging of the internal electrodes.

In the second preferred embodiment, the green chips are rinsed as necessary to wash away the attached liquid including the degreasing agent (the grinding fluid or the cutting fluid, and the cleaning solution as necessary). For rinsing, the green chips are preferably washed with water, and are more preferably ultrasonically cleaned with water, for example.

After rinsing, a drying step is preferably performed. The drying step may be performed, for example, by a method such as removing water by air, removing water by centrifugal force by rotating a workpiece, removing water by air and centrifugal force, and drying in an oven set to a temperature of about 40° C. or higher and about 100° C. or lower.

Subsequently, the raw ceramic protective layer is formed on the cut side surface. The method for forming the raw ceramic protective layer is preferably as described in the first preferred embodiment.

After forming the raw ceramic protective layer, the drying step is performed as necessary. Next, the same tumbling step as described with reference to FIGS. 9A and 9B is preferably performed.

As is described above, the grinding or cutting process is also performed on the opposite cut side surface. For example, when the grinding process is performed for the first process (on one cut side surface), the grinding process or cutting process may be performed for the second process (on the other cut side surface). The conditions for the second grinding or cutting process may be the same as or different from the conditions for the first grinding or cutting process. The type of the degreasing agent in the grinding fluid for the second grinding process or in the cutting fluid for the second cutting process may be the same as or different from the type of the degreasing agent in the grinding fluid for the first grinding process or in the cutting fluid for the first cutting process.

After the second grinding or cutting process, the cut side surface may be ultrasonically cleaned. In this case, the cleaning solution for ultrasonic cleaning preferably includes the degreasing agent. The type of the degreasing agent in the cleaning solution for the second ultrasonic cleaning may be the same as or different from the type of the degreasing agent in the cleaning solution for the first ultrasonic cleaning.

As is described above, after forming the raw ceramic protective layer on the opposite cut side surface, the drying step is performed as necessary. Raw component bodies are thus obtained.

After firing the raw component bodies obtained, an external electrode is formed on both surfaces of each fired component body, whereby the monolithic ceramic capacitor 11 illustrated in FIG. 1 is obtained.

Third Preferred Embodiment

A third preferred embodiment of the present invention describes a case in which, unlike the first preferred embodiment and the second preferred embodiment, the cut side surface is ultrasonically cleaned and a cleaning solution for ultrasonic cleaning contains the degreasing agent.

First, according to the method described in the first preferred embodiment, a mother block is produced which includes a plurality of ceramic green sheets stacked on each other and an internal electrode pattern arranged along each interface between the ceramic green sheets. The mother block obtained is pressed in the stacking direction by a method such as isostatic pressing, for example.

The pressed mother block is cut along a first cutting line and a second cutting line perpendicular or substantially perpendicular to each other, such that a plurality of green chips are obtained. A method such as dicing, force-cutting, or laser cutting, for example, is suitably used for the cutting.

When cutting the mother block by dicing, the same dicing method as described in the first preferred embodiment may preferably be used. In this case, the type of the degreasing agent in the cutting fluid for the dicing may be the same as or different from the type of a degreasing agent in a cleaning solution for ultrasonic cleaning described later.

As is the case with the first preferred embodiment, as illustrated in FIG. 7, the mother block 35 is cut along the first cutting lines 33 and the second cutting line 34 that are perpendicular or substantially perpendicular to each other, such that the plurality of green chips 19 arranged in the row and column directions are obtained. At this time, preferably, the mother block 35 is cut while being affixed to the adhesive sheet 38 having expandability so that the multiple green chips 19 will be arranged in the row and column directions.

In addition, preferably, as illustrated in FIG. 8, the multiple green chips 19 arranged in the row and column directions are spaced apart from each other by expanding the adhesive sheet illustrated in FIG. 7. Subsequently, a tumbling step is preferably performed in which the multiple green chips are tumbled so as to make the cut side surface of each of the green chips uniformly an open surface.

In the third preferred embodiment, the cut side surface is ultrasonically cleaned, and a cleaning solution for ultrasonic cleaning preferably includes the degreasing agent.

The ultrasonic cleaning method is preferably as described in the second preferred embodiment. The ultrasonic cleaning may be performed at any stage after cutting the mother block, as long as it is performed before forming a raw ceramic protective layer. For example, the ultrasonic cleaning may be performed before or after the multiple green chips are spaced apart from each other, and before or after the tumbling step. In addition, the ultrasonic cleaning may be performed without performing the tumbling step.

The degreasing agent in the cleaning solution may be of any suitable type. Examples thereof include those described in the first preferred embodiment.

The temperature of the cleaning solution including the degreasing agent is not particularly limited, but is preferably about 10° C. or higher and about 70° C. or lower, and more preferably about 20° C. or higher and about 40° C. or lower, for example, in view of removing sagging of the internal electrodes.

The concentration of the degreasing agent in the cleaning solution is not particularly limited, but is preferably about 0.1% by weight or more and about 50% by weight or less, for example, in view of removing sagging of the internal electrodes.

In the third preferred embodiment, the green chips are rinsed as necessary to wash away the attached cleaning solution including the degreasing agent. For rinsing, the green chips are preferably washed with water, and are more preferably ultrasonically cleaned with water, for example.

After rinsing, a drying step is preferably performed. The drying step is preferably performed, for example, in a manner described in the second preferred embodiment.

Subsequently, the raw ceramic protective layer is formed on the cut side surface. The raw ceramic protective layer is preferably formed by the method described in the first preferred embodiment, for example.

After forming the raw ceramic protective layer, the drying step is performed as necessary. Next, the same tumbling step as described with reference to FIGS. 9A and 9B is preferably performed.

As is described above, after forming the raw ceramic protective layer on the opposite cut side surface, the drying step is performed as necessary. Raw component bodies are thus obtained.

After firing the raw component bodies obtained, an external electrode is formed on both surfaces of each fired component body, whereby the monolithic ceramic capacitor 11 illustrated in FIG. 1 is obtained.

The first preferred embodiment describes a case in which after cutting the mother block, the raw ceramic protective layer is formed on the cut side surface. Yet, after cutting the mother block, the grinding or cutting process may be performed on the cut side surface before forming the raw ceramic protective layer thereon. In this case, the grinding fluid for the grinding process or the cutting fluid for the cutting process may or may not include the degreasing agent. Further, after the grinding process or cutting process, ultrasonic cleaning may be performed on the cut side surface before forming the raw ceramic protective layer thereon. In this case, the cleaning solution for ultrasonic cleaning may or may not include the degreasing agent.

The third preferred embodiment describes a case in which after cutting the mother block, ultrasonic cleaning is performed on the cut side surface before forming the raw ceramic protective layer thereon. Yet, after cutting the mother block, the grinding or cutting process may be performed on the cut side surface before ultrasonic cleaning. In this case, the grinding fluid for the grinding process or the cutting fluid for the cutting process may or may not include the degreasing agent.

In methods for manufacturing monolithic ceramic electronic components according to preferred embodiments of the present invention, a method for treating the cut side surface with the degreasing agent is not limited to those described in the above preferred embodiments. The cut side surface may be treated with the degreasing agent by a different method.

In the above preferred embodiments, the mother block is cut along the first cutting lines and the second cutting lines to obtain multiple green chips, and then the raw ceramic protective layer is formed on each cut side surface. Yet, the following modifications may be made.

Specifically, the mother block is cut only along the first cutting lines to obtain a plurality of rod-shaped green blocks each including internal electrodes exposed on each cut side surface produced by cutting along the first cutting lines, followed by forming the raw ceramic protective layer on each cut side surface. Then, the green blocks are cut along the second cutting lines to obtain a plurality of raw component bodies, followed by firing of these raw component bodies. After firing, the same steps as described in the above preferred embodiments are performed, such that monolithic ceramic electronic components are obtained.

Hereinafter, examples that specifically disclose methods for manufacturing a monolithic ceramic electronic component according to preferred embodiments of the present invention are described, but the present invention is not limited to these examples.

EXAMPLE 1

$BaTiO_3$ as a ceramic material was blended with a polyvinyl butyral binder, a phthalate plasticizer, a polyvinyl butyral dispersant, an antistatic agent, and an organic solvent. These components were wet-mixed in a ball mill to produce a ceramic slurry. Subsequently, the ceramic slurry was subjected to sheet forming by a lip method to obtain a ceramic green sheet in a rectangular shape. Next, a conductive paste including Ni, a cellulose binder, a dispersant, and a solvent was screen printed on the ceramic green sheet to form an internal electrode pattern primarily including Ni.

A plurality of ceramic green sheets including internal electrode patterns formed thereon were stacked with a shift in the width direction to produce a stack, and ceramic green sheets on which no internal electrode pattern is printed were stacked top and bottom of the stack. Thus, a mother block was obtained. The mother block obtained was pressed in the stacking direction by isostatic pressing.

The pressed mother block was cut into chips, so as to obtain green chips each including the internal electrodes exposed on both end surfaces and both side surfaces. The mother block was cut by dicing, and purified water was used as a cutting fluid. After cutting, ultrasonic cleaning with purified water was performed.

The polishing process with loose abrasive grains, as the grinding process, was performed on one of the cut side surfaces of each green chip. In Example 1, polishing was performed with a diamond slurry (polishing fluid) and a cotton polishing pad. A polishing fluid free of the degreasing agent was used.

After the polishing process, ultrasonic cleaning was performed with a cleaning solution including potassium pyrophosphate as the degreasing agent. After washing away the cleaning solution and drying, a green sheet for the ceramic protective layers was attached to the polished cut side surface, such that a raw ceramic protective layer was formed. The composition of the green sheet for ceramic protective layers is the same as that of the ceramic green sheets.

In the same or similar manner as described above, the polishing process with loose abrasive grains was also performed on the other cut side surface of each green chip, followed by ultrasonic cleaning with the cleaning solution including potassium pyrophosphate as the degreasing agent. After washing away the cleaning solution and drying, the raw ceramic protective layer was also formed on the other cut side surface. A raw component body was thus obtained.

The raw component body obtained was degreased in a nitrogen atmosphere, followed by firing in a hydrogen/nitrogen mixed atmosphere. After firing, the conductive paste was applied and fired to form external electrodes, such that a monolithic ceramic capacitor of Example 1 was obtained.

COMPARATIVE EXAMPLE 1

In Comparative Example 1, a monolithic ceramic capacitor including external electrodes was manufactured in the same or similar manner as in Example 1, except that neither the polishing process nor ultrasonic cleaning was performed on both cut side surfaces.

A cut side surface before forming an external electrode thereon was photographed with a scanning electron microscope (SEM) at a magnification of 7000×. The number of portions at which Ni particles are in contact with each other completely over the space between the layers was counted among 14 to 16 internal electrodes. Table 1 shows the results in "Number of short-circuited portion".

The capacitance of each of 100 monolithic ceramic capacitors was measured by an LCR meter, and the short circuit failure rate was calculated. Table 1 shows the results in "Short circuit failure rate".

TABLE 1

| | Polishing process | Ultrasonic cleaning | Number of short-circuited portions | Short circuit failure rate |
|---|---|---|---|---|
| Example 1 | Performed | Performed (degreasing agent) | 0 | 25% |

TABLE 1-continued

|  | Polishing process | Ultrasonic cleaning | Number of short-circuited portions | Short circuit failure rate |
|---|---|---|---|---|
| Comparative Example 1 | Not performed | Not performed | 4 | 100% |

As shown in Table 1, the occurrence of short-circuited portions was observed on the cut side surfaces in Comparative Example 1 in which neither the polishing process nor ultrasonic cleaning was performed on the cut side surfaces. In contrast, no short-circuited portion was observed in Example 1 in which the cut side surfaces were ultrasonically cleaned with the cleaning solution including potassium pyrophosphate as the degreasing agent after the polishing process. Further, Example 1 exhibited a much lower short circuit failure rate than Comparative Example 1.

Figure 14A:
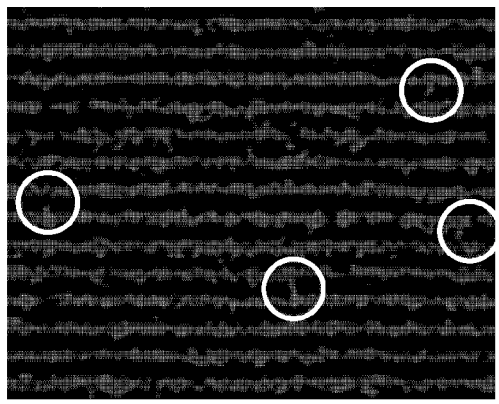
FIG. 14A is a Ni element mapping on a cut side surface of a monolithic ceramic capacitor of Comparative Example 1.
Figure 14B:
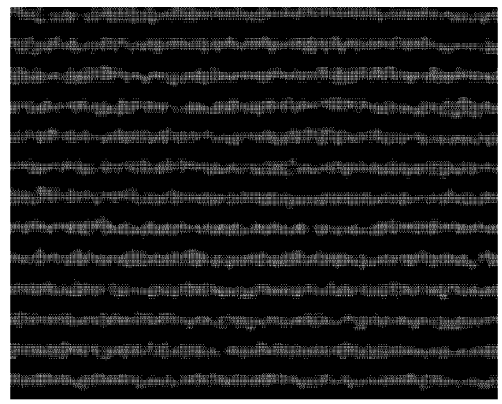
FIG. 14B is a Ni element mapping on a cut side surface of a monolithic ceramic capacitor of Example 1.

FIG. 14A is a Ni element mapping on a cut side surface of the monolithic ceramic capacitor of Comparative Example 1. FIG. 14B is a Ni element mapping on a cut side surface of the monolithic ceramic capacitor of Example 1.

Similar to the results in Table 1, the occurrence of short-circuited portions (circled portions in FIG. 14A) was observed as illustrated in FIG. 14A in Comparative Example 1 in which neither the polishing process nor ultrasonic cleaning was performed on the cut side surfaces. In contrast, no short-circuited portion was observed as illustrated in FIG. 14B in Example 1 in which the cut side surfaces were ultrasonically cleaned with the cleaning solution including potassium pyrophosphate as the degreasing agent after the polishing process.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a monolithic ceramic electronic component, the method comprising:
preparing a mother block including a plurality of ceramic green sheets stacked on each other, and an internal electrode pattern arranged along each of a plurality of interfaces between the ceramic green sheets;
cutting the mother block along a first cutting line and a second cutting line that are perpendicular or substantially perpendicular to each other to obtain a plurality of green chips, the green chips each having a laminated structure including a plurality of ceramic layers and a plurality of internal electrodes in a raw state, the internal electrodes being exposed on a cut side surface produced by cutting along the first cutting line;
forming a raw ceramic protective layer on the cut side surface to obtain a raw component body; and
firing the raw component body; wherein
the cut side surface on which the internal electrodes are exposed is treated with a degreasing agent.

2. The method according to claim 1, wherein
the mother block is cut by dicing to obtain the plurality of green chips; and
a cutting fluid for the dicing includes the degreasing agent.

3. The method according to claim 1, further comprising:
performing a grinding process with abrasive grains or a cutting process with a cutting bite on the cut side surface before forming the raw ceramic protective layer thereon; wherein
a grinding fluid for the grinding process or a cutting fluid for the cutting process includes the degreasing agent.

4. The method according to claim 3, further comprising:
after the grinding process or the cutting process, ultrasonically cleaning the cut side surface before forming the raw ceramic protective layer thereon; wherein
a cleaning solution for the ultrasonic cleaning includes the degreasing agent.

5. The method according to claim 1, further comprising:
after cutting the mother block, ultrasonically cleaning the cut side surface before forming the raw ceramic protective layer thereon; wherein
a cleaning solution for the ultrasonic cleaning includes the degreasing agent.

6. The method according to claim 1, wherein the degreasing agent includes a condensed phosphate.

7. The method according to claim 6, wherein the condensed phosphate is a pyrophosphate.

8. The method according to claim 7, wherein the condensed phosphate is potassium pyrophosphate.

9. The method according to claim 1, wherein the degreasing agent contains polyalkylene glycol alkyl ether whose alkyl group has 1 to 12 carbon atoms.

10. The method according to claim 9, wherein the polyalkylene glycol alkyl ether is polyethylene glycol alkyl ether.

11. The method according to claim 10, wherein the polyalkylene glycol alkyl ether is polyethylene glycol lauryl ether.

12. The method according to claim 1, wherein the temperature of liquid containing the degreasing agent is 10° C. or higher and 70° C. or lower.

13. A method for manufacturing a monolithic ceramic electronic component, the method comprising:
preparing a mother block including a plurality of ceramic green sheets stacked on each other, and an internal electrode pattern arranged along each of a plurality of interfaces between the ceramic green sheets;
cutting the mother block along a first cutting line to obtain a plurality of rod-shaped green blocks, the green blocks each having a laminated structure including a plurality of ceramic layers and a plurality of internal electrodes in a raw state, the internal electrodes being exposed on a cut side surface produced by cutting along the first cutting line;
forming a raw ceramic protective layer on the cut side surface;
cutting the rod-shaped green blocks each including the raw ceramic protective layer formed thereon along a second cutting line perpendicular or substantially perpendicular to the first cutting line to obtain a plurality of raw component bodies; and
firing the raw component bodies; wherein
the cut side surface on which the internal electrodes are exposed is treated with a degreasing agent.

14. The method according to claim 13, wherein
the mother block is cut by dicing to obtain the plurality of rod-shaped green blocks; and
a cutting fluid for the dicing includes the degreasing agent.

15. The method according to claim 13, further comprising:
- performing a grinding process with abrasive grains or a cutting process with a cutting bite on the cut side surface before forming the raw ceramic protective layer thereon; wherein
- a grinding fluid for the grinding process or a cutting fluid for the cutting process includes the degreasing agent.

16. The method according to claim 15, further comprising:
- after the grinding process or the cutting process, ultrasonically cleaning the cut side surface before forming the raw ceramic protective layer thereon; wherein
- a cleaning solution for the ultrasonic cleaning includes the degreasing agent.

17. The method according to claim 13, further comprising:
- after cutting the mother block, ultrasonically cleaning the cut side surface before forming the raw ceramic protective layer thereon; wherein
- a cleaning solution for the ultrasonic cleaning includes the degreasing agent.

18. The method according to claim 13, wherein the degreasing agent contains a condensed phosphate.

19. The method according to claim 18, wherein the condensed phosphate is a pyrophosphate.

20. The method according to claim 19, wherein the condensed phosphate is potassium pyrophosphate.

* * * * *